(12) United States Patent
Greene et al.

(10) Patent No.: US 9,828,113 B2
(45) Date of Patent: Nov. 28, 2017

(54) TAILSTRIKE WARNING SYSTEM

(71) Applicant: Safe Flight Instrument Corporation, White Plains, NY (US)

(72) Inventors: Randall A. Greene, White Plains, NY (US); Shawn Beyer, New York, NY (US)

(73) Assignee: SAFE FLIGHT INSTRUMENT CORPORATION, White Plains, NY (US)

( * ) Notice: Subject to any disclaimer, the term of this patent is extended or adjusted under 35 U.S.C. 154(b) by 230 days.

(21) Appl. No.: 14/072,732

(22) Filed: Nov. 5, 2013

(65) Prior Publication Data

US 2015/0123821 A1 May 7, 2015

(51) Int. Cl.
| G01C 23/00 | (2006.01) |
| B64D 45/04 | (2006.01) |
| B64D 43/00 | (2006.01) |
| G08G 5/00 | (2006.01) |
| G08G 5/02 | (2006.01) |

(52) U.S. Cl.
CPC ............. *B64D 45/04* (2013.01); *B64D 43/00* (2013.01); *G01C 23/005* (2013.01); *G08G 5/0021* (2013.01); *G08G 5/025* (2013.01)

(58) Field of Classification Search
None
See application file for complete search history.

(56) References Cited

U.S. PATENT DOCUMENTS

| 3,291,421 A | 12/1966 | Kramer et al. |
| 3,665,465 A | 5/1972 | Miller, deceased |
| 3,691,356 A | 9/1972 | Miller |
| 3,712,122 A | 1/1973 | Harris et al. |
| 3,805,033 A | 4/1974 | Manke et al. |
| 3,934,221 A | 1/1976 | Bateman et al. |
| 3,936,797 A | 2/1976 | Andresen, Jr. |
| 3,994,455 A | 11/1976 | Simpson |
| 4,092,716 A | 5/1978 | Berg et al. |
| 4,319,218 A | 3/1982 | Bateman |
| 4,373,184 A | 2/1983 | Lambregts |
| 4,431,994 A | 2/1984 | Gemin |
| 4,536,843 A | 8/1985 | Lambregts |

(Continued)

FOREIGN PATENT DOCUMENTS

| EP | 1 843 127 | 10/2007 |
| FR | 2 892 503 | 4/2007 |

(Continued)

OTHER PUBLICATIONS

Jeff Scott, "Angle of Attack and Pitch Angle," Feb. 29, 2004, accessed May 24, 2016 <http://www.aerospaceweb.org/question/aerodynamics/q0165.shtml>.*

(Continued)

*Primary Examiner* — Laura Nguyen
(74) *Attorney, Agent, or Firm* — Morrison & Foerster LLP (57) ABSTRACT

An aircraft tailstrike warning method includes identifying a first value representing an aircraft angle of attack, identifying a second value representing a maximum aircraft angle of attack, identifying a difference between the first value and the second value, and providing a tailstrike warning when the difference between the first value and the second value is less than a threshold amount.

2 Claims, 5 Drawing Sheets

(56) References Cited

U.S. PATENT DOCUMENTS

| | | | |
|---|---|---|---|
| 4,551,723 A | 11/1985 | Paterson | |
| 4,675,823 A | 6/1987 | Noland, deceased | |
| 4,764,872 A | 9/1988 | Miller | |
| 5,020,747 A | 6/1991 | Orgun et al. | |
| 5,031,102 A | 7/1991 | Robbins et al. | |
| 5,038,141 A | 8/1991 | Grove | |
| 5,187,478 A | 2/1993 | Grove | |
| 5,220,322 A | 6/1993 | Bateman et al. | |
| 5,402,116 A | 3/1995 | Ashley | |
| 5,406,487 A | 4/1995 | Tanis | |
| 5,781,126 A | 7/1998 | Paterson et al. | |
| 5,901,927 A | 5/1999 | Ho | |
| 6,121,899 A | 9/2000 | Theriault | |
| 6,186,447 B1 | 2/2001 | Virdee | |
| 6,216,064 B1 | 4/2001 | Johnson et al. | |
| 6,422,517 B1 | 7/2002 | DeWitt et al. | |
| 6,462,703 B2 | 10/2002 | Hedrick | |
| 6,507,289 B1 | 1/2003 | Johnson et al. | |
| 6,711,479 B1 | 3/2004 | Staggs | |
| 6,761,336 B2 | 7/2004 | DeWitt et al. | |
| 6,845,304 B1 | 1/2005 | Young | |
| 6,940,427 B2 | 9/2005 | Bateman | |
| 6,999,023 B2 | 2/2006 | Block | |
| 7,088,264 B2 | 8/2006 | Riley | |
| 7,725,220 B2 | 5/2010 | Petrich et al. | |
| 8,027,756 B2 | 9/2011 | Davis et al. | |
| 8,126,600 B2 | 2/2012 | Conner et al. | |
| 8,175,763 B2 | 5/2012 | Yamane et al. | |
| 8,321,071 B2 | 11/2012 | Klooster | |
| 8,478,458 B2 | 7/2013 | Faurie et al. | |
| 8,494,693 B2 | 7/2013 | Murphy | |
| 8,630,756 B2 | 1/2014 | Fleiger-Holmes et al. | |
| 8,660,722 B2 | 2/2014 | Dumoulin et al. | |
| 8,723,695 B2 | 5/2014 | Bourret et al. | |
| 8,788,128 B1 | 7/2014 | McCusker | |
| 8,831,799 B1 | 9/2014 | Levine et al. | |
| 8,903,572 B1 | 12/2014 | Hagelin | |
| 2001/0052562 A1 | 12/2001 | Ishihara et al. | |
| 2002/0030607 A1 | 3/2002 | Conner et al. | |
| 2002/0075171 A1 | 6/2002 | Kuntman et al. | |
| 2002/0077731 A1 | 6/2002 | Hilb | |
| 2003/0016145 A1* | 1/2003 | Bateman | B64D 43/02 340/967 |
| 2003/0093187 A1 | 5/2003 | Walker | |
| 2003/0206119 A1 | 11/2003 | Riley | |
| 2004/0057177 A1* | 3/2004 | Glahn | H02J 3/14 361/62 |
| 2004/0070521 A1 | 4/2004 | Greene | |
| 2006/0041345 A1 | 2/2006 | Metcalf | |
| 2006/0052912 A1 | 3/2006 | Meunier | |
| 2006/0195235 A1 | 8/2006 | Ishihara et al. | |
| 2006/0220921 A1* | 10/2006 | Foucart | G05D 1/0808 340/975 |
| 2006/0271249 A1 | 11/2006 | Testrake et al. | |
| 2007/0239326 A1 | 10/2007 | Johnson et al. | |
| 2008/0243316 A1 | 10/2008 | Sacle et al. | |
| 2009/0138144 A1 | 5/2009 | Flannigan et al. | |
| 2009/0207047 A1 | 8/2009 | Ross, III | |
| 2009/0262008 A1 | 10/2009 | Thomas et al. | |
| 2010/0090867 A1* | 4/2010 | Christophe | G01W 1/00 340/970 |
| 2011/0029158 A1 | 2/2011 | Klooster | |
| 2011/0077858 A1 | 3/2011 | Coulmeau | |
| 2011/0098967 A1 | 4/2011 | Khial | |
| 2011/0199253 A1 | 8/2011 | Delga et al. | |
| 2011/0251740 A1 | 10/2011 | Gomez Ledesma et al. | |
| 2011/0276217 A1 | 11/2011 | Sim | |
| 2012/0053760 A1 | 3/2012 | Burnside et al. | |
| 2012/0056760 A1 | 3/2012 | Bourret et al. | |
| 2012/0095625 A1 | 4/2012 | Ishihara et al. | |
| 2012/0191273 A1 | 7/2012 | Jacobs et al. | |
| 2012/0265374 A1 | 10/2012 | Yochum | |
| 2012/0316706 A1* | 12/2012 | Guedes | G05D 1/0833 701/15 |
| 2013/0030614 A1 | 1/2013 | Ding | |
| 2013/0245982 A1 | 9/2013 | Buchanan et al. | |
| 2013/0274964 A1 | 10/2013 | Jesse et al. | |
| 2014/0074326 A1 | 3/2014 | Pereira | |
| 2014/0090471 A1 | 4/2014 | Hsu | |
| 2014/0129058 A1 | 5/2014 | Elahi et al. | |
| 2014/0172202 A1 | 6/2014 | Greene | |
| 2014/0229056 A1 | 8/2014 | Catt | |
| 2015/0120098 A1 | 4/2015 | Catalfamo et al. | |
| 2015/0120099 A1 | 4/2015 | Herbert et al. | |
| 2015/0123821 A1 | 5/2015 | Greene | |

FOREIGN PATENT DOCUMENTS

| | | |
|---|---|---|
| FR | 2 956 491 | 8/2011 |
| FR | 2 964 466 | 3/2012 |
| GB | 2 300 167 | 10/1996 |

OTHER PUBLICATIONS

International Search Report and Written Opinion mailed Jul. 11, 2014, directed to International Application No. PCT/US2013/68580; 14 pages.

Cashman et al., "Operational Use of Angle of Attack on Modern Commercial Jet Airplanes," Dec. 31, 2012, 7 pages.

Supplementary European Search Report for EP 13897022.3, dated Jun. 21, 2017, 3 pages.

\* cited by examiner

TAILSTRIKE WARNING SYSTEM

FIELD OF THE DISCLOSURE

This disclosure generally relates to systems and methods for flying an aircraft. More particularly, this disclosure relates to systems and methods for providing a tailstrike warning by analyzing an angle of attack of the aircraft.

BACKGROUND

A tailstrike can result in extensive damage to an aircraft. A tailstrike is said to occur when the tail section of an aircraft strikes the ground, either on takeoff (when the aircraft climbs too rapidly) or landing (when the nose is raised too much during flare).

In addition to readily-apparent structural damage, a tailstrike may result in unseen structural faults that can lead to a delayed fracture. For this reason, aircraft that suffer a tailstrike typically undergo a variety of tests to ensure reliability for further flight. The subsequent loss in airtime may result in lost revenues for the aircraft operator.

Tailstrikes are particularly common with transport planes. A possible reason is that a transport plane's weight can vary substantially between flights, which may result in substantial variances in the aircraft's responsiveness to pitch rotation. This, in turn, may result in crew under/overestimating pitch rotation, which can lead to a tailstrike.

Tailstrikes are also common when a pilot is familiar with lighter cargo—passenger flights, for example—and then begins operating heavier flights. An aircraft with a heavier cargo may have a different sensitivity to pitch rotation commands. This change in sensitivity may result in the inexperienced pilot under/overestimating pitch rotation.

Some known solutions to tailstrikes include adding a skid or wheel in the rear of the aircraft to prevent damage. This has limited efficacy, however, because the skids only reduce the impact of the strike; structural damage can and does occur.

Some other known solutions include offering a warning to the crew of an impending tailstrike. Traditionally, such tailstrike warnings are determined by analyzing the aircraft pitch angle. This has proved an unsatisfactory solution, however, because pilots typically do not rely on pitch angle for understanding fight conditions. Because pilots do not rely on pitch angle for understanding flight conditions, pitch angle based information can be disorienting, especially during takeoff and landing when the pilot is absorbing and processing large quantities of critical information. As a result, analyzing pitch angle for tailstrike warnings has proven to have limited effectiveness in combating tailstrikes.

SUMMARY

This disclosure relates to systems and methods for providing a tailstrike warning for an aircraft through analyzing an angle of attack of the aircraft. Advantageously, the systems and methods may provide pilots with warnings that are more readily understood and more useful in taking corrective actions.

In one embodiment, a tailstrike warning method for an aircraft includes receiving an angle of attack of the aircraft, determining a tailstrike proximity of the aircraft by analyzing the angle of attack of the aircraft, comparing the tailstrike proximity of the aircraft to a threshold, and providing the tailstrike warning when the comparison indicates the aircraft meets the threshold.

In some embodiments, determining the tailstrike proximity includes analyzing a rate of change of the angle of attack of the aircraft. In some further embodiments, the angle of attack is adjusted by the rate of change multiplied by a constant.

In another embodiment, determining the tailstrike proximity includes determining the difference between a maximum allowable angle of attack and an adjusted angle of attack. In some further embodiments, the adjusted angle of attack includes the angle of attack and a time rate of change of the angle attack multiplied by a constant. In other embodiments, the maximum allowable angle of attack is determined by adjusting a tailstrike angle of attack by a safety margin. In some further embodiments, the safety margin includes a number of degrees from the tailstrike angle of attack.

In some embodiments, the tailstrike warning includes an audible warning. In some embodiments, the tailstrike warning includes modifying a flight director. In some further embodiments, modifying the flight director includes adding a tailstrike proximity ceiling on the flight director. In yet further embodiments, a position of the tailstrike proximity ceiling on the flight director is determined by the tailstrike proximity.

In one embodiment, an aircraft flight director includes a display, an aircraft symbol on the display, and a tailstrike proximity ceiling positioned on the display above the aircraft symbol. The tailstrike proximity ceiling on the display is determined by analyzing an angle of attack of the aircraft.

In some embodiments, the tailstrike proximity ceiling is determined by analyzing a difference between a maximum allowable angle of attack and an adjusted angle of attack. In further embodiments, the adjusted angle of attack includes the angle of attack and a time rate of change of the angle attack multiplied by a constant. In other embodiments, the maximum allowable angle of attack is determined by adjusting a tailstrike angle of attack by a safety margin. In further embodiments, the safety margin includes a number of degrees from the tailstrike angle of attack.

In some embodiments, the position of the tailstrike proximity ceiling is determined by multiplying the difference between the maximum allowable angle of attack and the adjusted angle of attack by a constant. In some further embodiments, the constant is determined by analyzing a nominal angle of attack of the aircraft for a landing or an approach and a reference airspeed of the aircraft. In further embodiments, the constant is determined so that the tailstrike proximity ceiling on the display is not visible when the aircraft is flying at the nominal angle of attack for a landing or an approach and at the reference airspeed.

One embodiment includes a control system for activating a tailstrike warning for an aircraft. The system receives an angle of attack of the aircraft, determines a tailstrike proximity of the aircraft by analyzing the angle of attack of the aircraft, compares the tailstrike proximity of the aircraft to a threshold, and activates the tailstrike warning when the comparison indicates the aircraft meets the threshold.

In one embodiment, an aircraft tailstrike warning method includes identifying a first value representing an aircraft angle of attack, identifying a second value representing a maximum aircraft angle of attack, identifying a difference between the first value and the second value, and providing a tailstrike warning when the difference between the first value and the second value is less than a threshold amount.

In some embodiments, the aircraft angle of attack exhibits a time rate of change and the method includes modifying the first value in accordance with the time rate of change of the aircraft angle of attack. In some embodiments, the method includes modifying the warning in accordance with changes in the difference between the first value and the second value. In some embodiments, the maximum aircraft angle of attack includes an angle of attack at which aircraft tailstrike occurs minus a third value.

In one embodiment, an aircraft tailstrike warning method includes identifying a first value representing an aircraft angle of attack, identifying a second value representing a maximum aircraft angle of attack, displaying a dynamic limit that visually indicates aircraft proximity to tailstrike, and displaying a deviation from the maximum angle of attack multiplied by a scale factor, the scale factor selected such that the dynamic limit is not displayed when the aircraft is at a nominal angle of attack for takeoff or approach at a normal reference airspeed.

DETAILED DESCRIPTION

In the following description of embodiments, reference is made to the accompanying drawings which form a part hereof, and in which it is shown by way of illustration specific embodiments in which the claimed subject matter may be practiced. It is to be understood that other embodiments may be utilized and structural changes may be made without departing from the scope of the claimed subject matter.

In some embodiments, a tailstrike warning for an aircraft is determined by analyzing an angle of attack of the aircraft. Advantageously, the systems and methods may provide pilots with warnings that are more readily understood and more useful in taking corrective actions.

Figure 1:
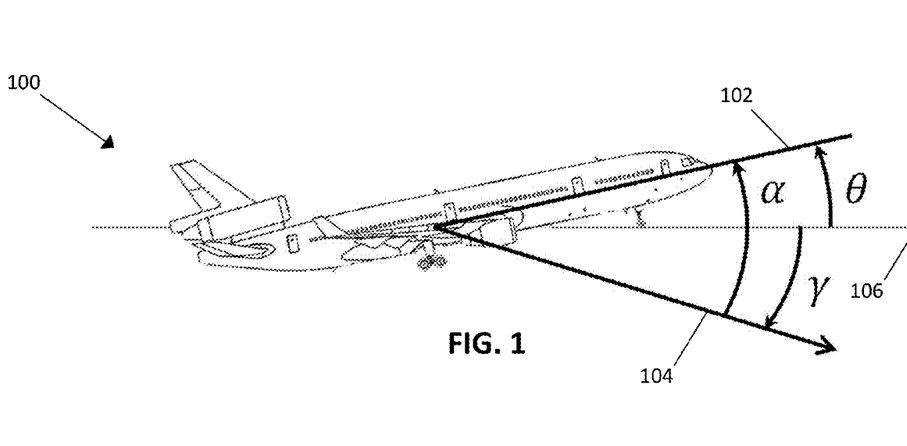
FIG. 1 depicts an example of an aircraft's angle of attack, flight path angle, and pitch angle, in accordance with an embodiment.

FIG. 1 depicts an example of an aircraft 100 and its angle of attack $\alpha$, flight path angle $\theta$, and pitch angle $\gamma$, in accordance with an embodiment. As used herein, an aircraft's angle of attack can be understood to include the angle between a reference line of the aircraft (for example, the chord line, identified as 102 in FIG. 1) and a flight-path (a vector representing the relative motion of the aircraft through the surrounding air, identified as 104 in FIG. 1). As used herein, an aircraft's flight path angle can be understood to include the angle between the flight path vector and the horizontal (identified as 106 in FIG. 1). As used herein, an aircraft's pitch angle can be understood to include the angle between the reference line of the aircraft and the horizontal. Both pitch and flight path angle are both measured from the horizontal 106 and the counterclockwise direction is assumed to be positive.

FIG. 1 illustrates this relationship during a positive pitch descent. In this case the flight path angle is negative since the aircraft is descending. As can be seen in FIG. 1, the angles are related by Equation 1:

$$\alpha = \theta - \gamma \quad \text{(Equation 1)}$$

When an aircraft is on the ground, the angle between the flight path vector and the horizontal—the flight path angle—is zero. When the flight path angle goes to zero, the relationship in Equation 1 becomes Equation 2:

$$\alpha = \theta + 0 \quad \text{(Equation 2)}$$

or, equivalently, $$\alpha = \theta \quad \text{(Equation 3)}$$

Figure 2:
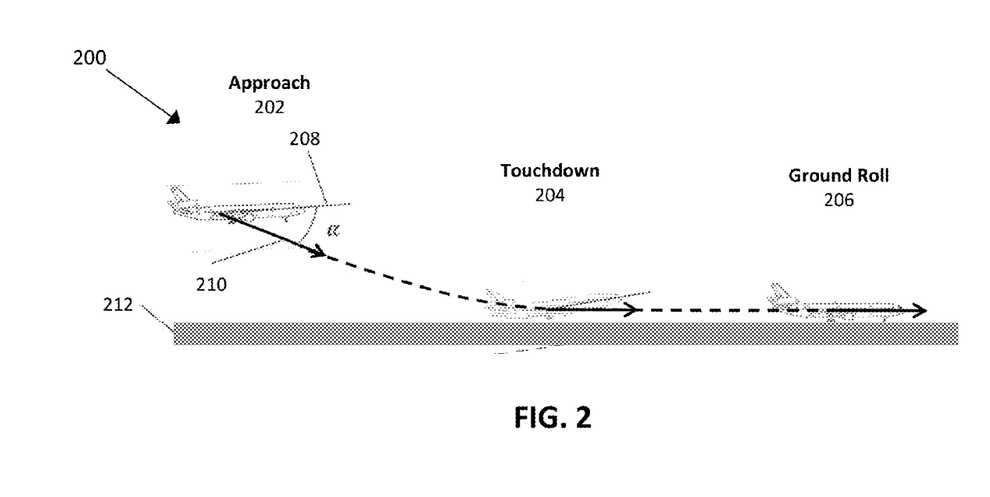
FIG. 2 depicts a flight sequence for an aircraft in a landing sequence, in accordance with an embodiment.

FIG. 2 depicts a flight sequence 200 for an aircraft during landing, in accordance with an embodiment. FIG. 2 illustrates the relationship between angle of attack $\alpha$, flight path angle $\theta$, and pitch angle $\gamma$ of an aircraft during the landing sequence.

The first stage 202 of the sequence of FIG. 2 illustrate the aircraft in approach. As can be seen in the first stage 202, there is an angle (i.e., the flight path angle) between the flight path vector 210 and the horizontal (i.e., the ground 212) during approach.

When the aircraft touches down, the aircraft begins to move parallel to the horizontal. This can be seen in the second 204 and third stage 206 of the landing sequence (touchdown and roll, respectively). Thus, the flight path vector and the horizontal are aligned beginning at the second stage 204 (touchdown) and so the flight path angle goes to zero. The angle of attack (between the flight path vector 210 and the chord line 208) may be non-zero during the second stage 204 (touchdown), but goes to zero during the third stage 206 (ground roll).

Tailstrikes occur when an aircraft is on the ground and an aircraft's pitch exceeds a critical angle, referred to herein as the tailstrike pitch angle $\theta_{ts}$. As shown in Equation 3, the angle of attack equals the pitch angle when the aircraft is on the ground, and so the tailstrike angle of attack ($\alpha_{ts}$) is equal to the tailstrike pitch angle ($\theta_{ts}$) when a tailstrike occurs. Accordingly, as an aircraft's pitch angle approaches a tailstrike pitch, the aircraft's angle of attack also approaches a tailstrike angle of attack.

Utilizing this relationship between tailstrike angle of attack and tailstrike pitch, some embodiments herein provide a tailstrike warning by analyzing an aircraft's angle of attack rather than the aircraft's pitch. Advantageously, this may beneficially allow pilots to receive warnings using more familiar flight parameters. In addition, during landing and takeoff (when tailstrikes occur), pilots are keenly attuned to angle of attack information. By maintaining their focus on angle of attack—rather than diverting it to pitch angle—pilots more easily avoid a tailstrike while also performing other flight maneuvers.

In some embodiments, an aircraft's proximity to a tailstrike ($\alpha_d$) may be determined as a function of the angle of attack. In some further embodiments, an aircraft's proximity to a tailstrike may be determined as the difference between a maximum allowable angle of attack ($\alpha_{max}$) and a function of the current angle of attack ($f(\alpha)$).

$$\alpha_d = \alpha_{max} - f(\alpha) \quad \text{(Equation 4)}$$

In some embodiments, the function $f(\alpha)$ includes adjusting the angle of attack for its time rate of change to give a rate adjusted angle of attack ($\alpha_r$). Including the rate adjusted angle of attack may provide for better advanced warning of a tailstrike. For example, an angle of attack that is only a few degrees from a tailstrike angle of attack may not be considered problematic if the angle of attack is maintained. However, an aircraft with an angle of attack that is relatively far from a tailstrike angle of attack may be in a more precarious position if that aircraft also has a high rate of change of angle of attack.

In some embodiments, $\alpha_r$ is determined by $$\alpha + k_\alpha \alpha' \quad \text{(Equation 5)}$$

where $\alpha'$ is the time rate of change of $\alpha$ and $k_\alpha$ is a "gain factor" to control sensitivity of $\alpha_r$ to the rate of change of the angle of attack. As one of skill in the art will readily recognize, Equation 5 is one example of a function of a rate adjusted angle of attack, and other functions may be used without deviating from the scope of the claimed subject matter.

In some embodiments, $k_\alpha$ can be varied to adjust the sensitivity of $\alpha_r$ to the rate of change of the angle of attack. Consequently, the sensitivity of the tailstrike proximity ($\alpha_d$) can be varied by adjusting $k_\alpha$. $k_\alpha$ may be adjusted for different flight conditions, different aircraft, different cargos, and different crews, for example.

Returning to Equation 4, the tailstrike proximity ($\alpha_d$) can also be varied by adjusting $\alpha_{max}$. In some embodiments, $\alpha_{max}$ may simply be the tailstrike angle of attack $\alpha_{ts}$. It may be advantageous, however, to provide a safety margin from the tailstrike angle of attack, to account for pilot error, sloped runways, etc. In some embodiments, a safety margin may be a degree difference from the tailstrike angle of attack. In some embodiments, the degree difference is 2 degrees. In some embodiments, the safety margin may be a percentage difference from the tailstrike angle of attack. In some embodiments, the safety margin may be variable. For example, different safety margins may be used for take-off versus landing, for different cargo weights, for different experience levels of pilots, for different runways, different flight conditions, etc.

In some embodiments, the tailstrike proximity ($\alpha_d$) is utilized to provide audible and/or visual alarms. In some embodiments, a sequence of escalating alarms are instigated as the tail strike proximity decreases (that is, as f($\alpha$) approaches $\alpha_{max}$).

Figure 3:
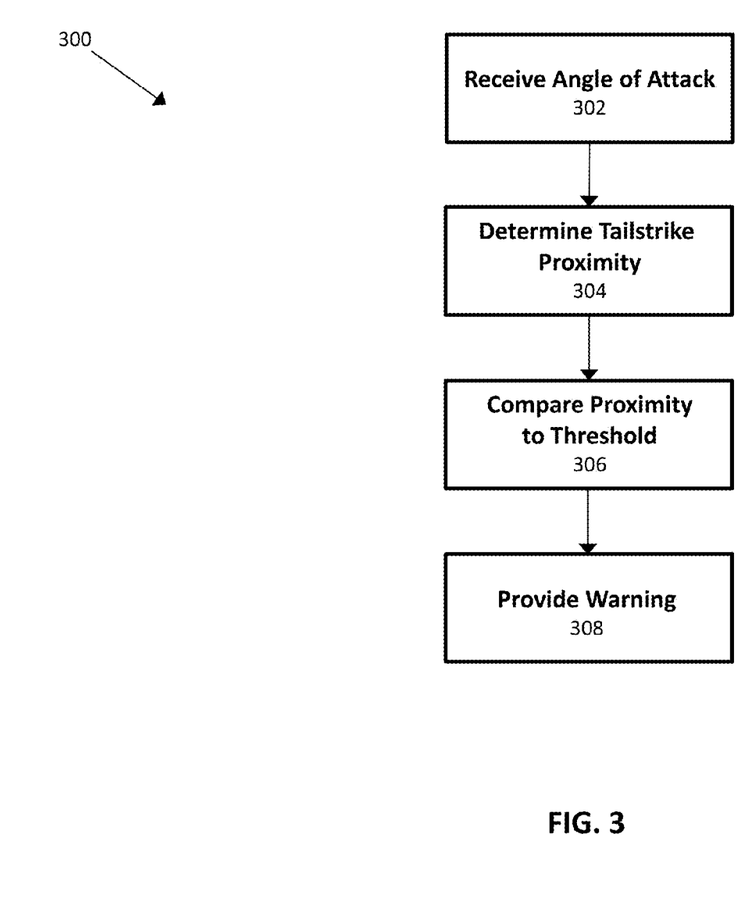
FIG. 3 depicts a method of providing a tailstrike warning for an aircraft, in accordance with an embodiment.

FIG. 3 depicts a method of providing a tailstrike warning for an aircraft 300, in accordance with an embodiment. Method 300 begins with receiving an angle of attack of the aircraft 302. The angle of attack is analyzed to determine a tailstrike proximity 304. Once the tailstrike proximity it determined, the proximity is compared to a predetermined threshold 306. When the tailstrike proximity meets the predetermined threshold, method 300 provides a tailstrike warning 308.

Determining the tailstrike proximity may include analyzing a rate of change of the angle of attack of the aircraft. Analyzing a rate of change of the angle of attack of the aircraft may include any of the algorithms and relations described in this document and may include other algorithms and relations. For example, the angle of attack may be adjusted by the rate of change multiplied by a constant, such as in Equation 5.

Determining the tailstrike proximity may include determining the difference between a maximum allowable angle of attack and an adjusted angle of attack. An example of such a determination includes Equation 4 above, but other algorithms and relations could be used. The adjusted angle of attack may include the angle of attack and a time rate of change of the angle attack multiplied by a constant. The maximum allowable angle of attack may be determined by adjusting a tailstrike angle of attack by a safety margin, such as the examples described in this document. The safety margin may include a number of degrees from the tailstrike angle of attack.

The tailstrike warning may be an audible warning and/or a visual warning, such as modifying a flight director. Modifying a flight director may include adding a tailstrike proximity ceiling on the flight director. A position of the tailstrike proximity ceiling on the flight director may be determined by the tailstrike proximity, such as those described below with respect to FIGS. 5A and 5B.

Figure 4:
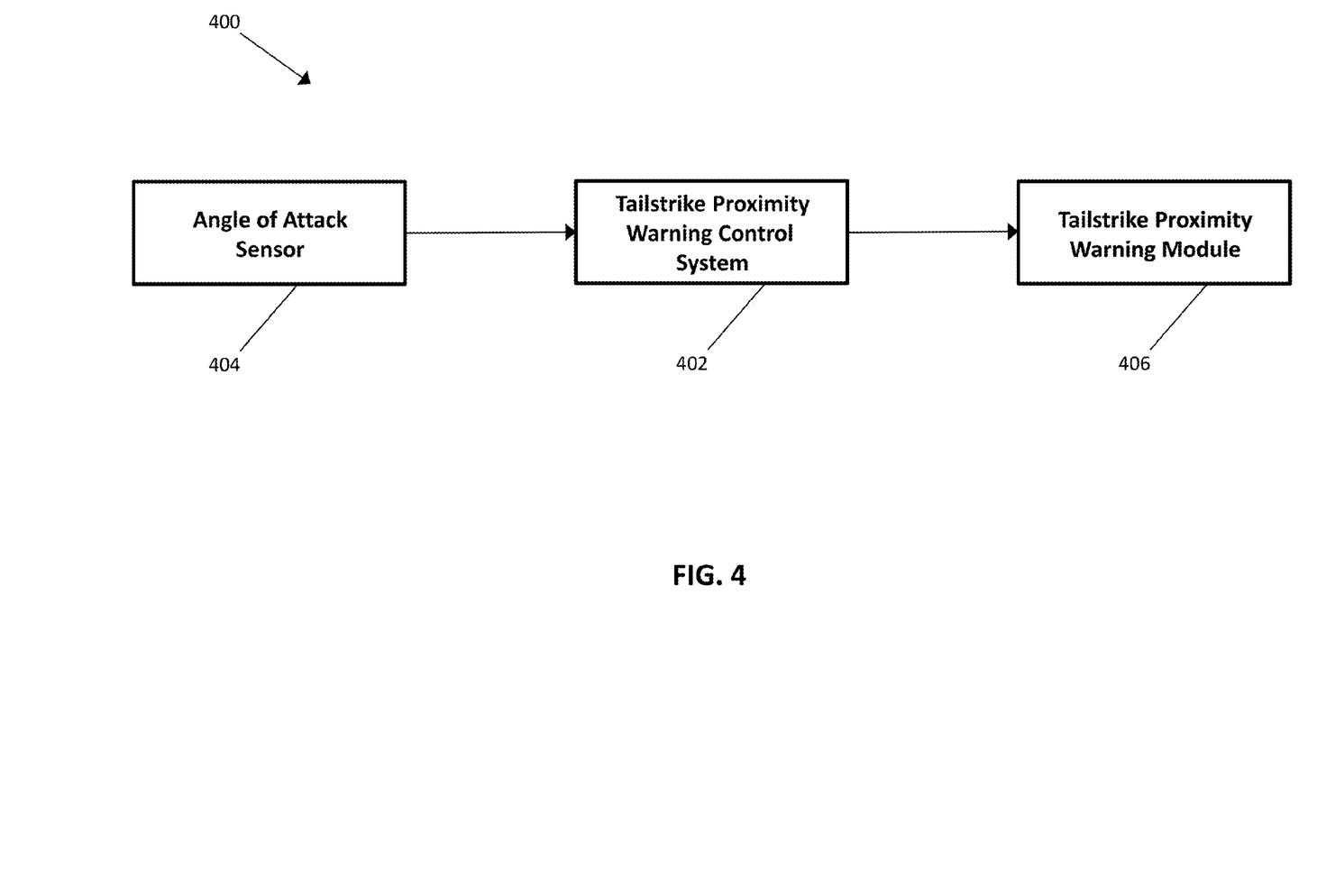
FIG. 4 depicts a tailstrike warning system, in accordance with an embodiment.

FIG. 4 depicts a tailstrike warning system 400, in accordance with an embodiment. Tailstrike warning system 400 includes a tailstrike proximity warning control system 402, which receives inputs from an angle of attack sensor 404 and provides an output to a tailstrike warning module 406.

After receiving an angle of attack of an aircraft, tailstrike proximity warning control system 402 determines a tailstrike proximity of the aircraft by analyzing the angle of attack of the aircraft, and then compares the tailstrike proximity of the aircraft to a predetermined threshold. When the tailstrike proximity warning control system 402 determines the threshold has been met, the control system sends a signal to the tailstrike warning module 406. A processor or other circuitry may be included in the tailstrike proximity control system 402 to process all data received.

Angle of attack sensor 404 may determine the aircraft's orientation to oncoming airflow. The angle of attack may be determined using AoA Sensors such as Safe Flight Instrument Corporation's Swept Vane AoA Sensor, Paddle Vane AoA Sensor, Integrated AoA Sensor or Lift Transducer. AoA Sensors are also produced by UTC, ASI, Thales, and others. Angle of attack may also be determined by any other mechanism for measuring angle of attack, such as differential pressure.

In some embodiments, tailstrike warning module 406 may include an audible, visual, tactile, or any other alarm. Such alarms may include flashing lights, horns or other audible alarms, or a voice announcing the tailstrike proximity warning. This may aid pilots who are not focused on the flight director to direct their attention there for a visual indication of tailstrike proximity.

In some embodiments, the frequency of the alarm increases as the safety margin for a tailstrike decreases. The frequency of the alarm may be a linear function of the tailstrike proximity. In some embodiments, the frequency of the alarm may change as the tailstrike proximity meets a sequence of predetermined thresholds.

Figure 5A:
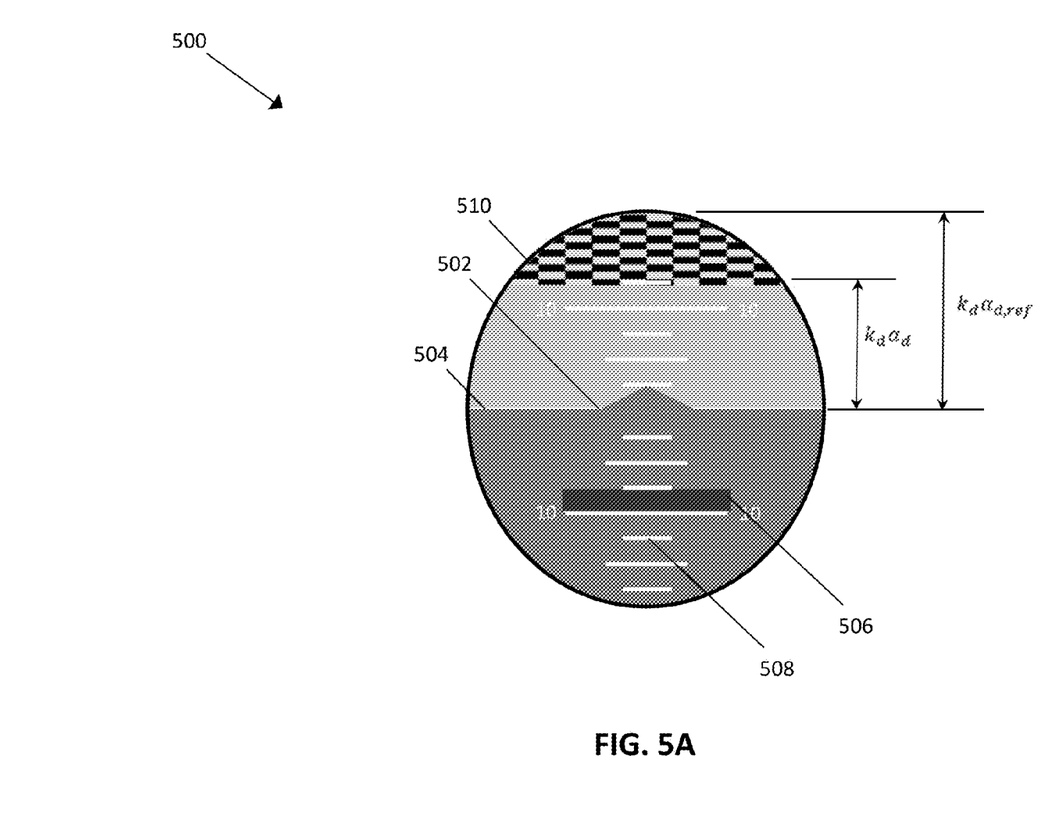
FIG. 5A depicts a visual tailstrike proximity warning system, in accordance with an embodiment.

FIG. 5A depicts a visual tailstrike proximity warning system, in accordance with an embodiment. Flight director 500 includes a fixed aircraft symbol 502, horizon line 504, runway 506, pitch indices 508, and a tailstrike ceiling 510.

Tailstrike ceiling 510 provides the pilot with a visual indication of the proximity of the aircraft to a tailstrike. In some embodiments, the position of tailstrike ceiling 510 on flight director 500 is determined by analyzing an aircraft's angle of attack.

In some further embodiments, the position of tailstrike ceiling 510 is based on the proximity to a tailstrike ($\alpha_d$) described above. In one example, the position of tailstrike ceiling 510 on the flight director may be a linear function of $\alpha_d$. The linear function may include multiplying $\alpha_d$ by a constant scale factor ($k_d$).

In some further embodiments, $k_d$ may be chosen so that the ceiling is not visible on the flight director when the aircraft is at the nominal angle of attack $\alpha_{ref}$ for either takeoff or approach at the normal reference airspeed $v_{ref}$. For example, the deviation ($\alpha_{d,\ ref}$) between the maximum allowable angle of attack and the nominal angle of attack may be calculated by $$\alpha_{d,\ ref} = \alpha_{max} - \alpha_{ref} \quad \text{(Equation 6)}$$

From this equation, the scale factor $k_d$ can be determined. Returning again to FIG. 5, the distance from the aircraft symbol to the top of the flight director is known. Since both $\alpha_{d,\ ref}$ and the distance from the fixed aircraft symbol to the top of the flight director are known, the scale factor $k_d$ can be calculated.

In some other embodiments, the distance indicated on the flight director may be a non-linear function of $\alpha_d$.

Flight director 500 depicts an aircraft on approach to landing, but one of ordinary skill in the art will readily appreciate that a similar display could be used to depict a take-off situation.

A flight director may include additional information not shown in FIG. 5A, as is known in the art. Further, one of skill in the art will readily recognize that other visualizations may be used for the depicting the proximity to a tailstrike and/or providing a tailstrike warning, and that flight director 500 is only one example.

Figure 5B:
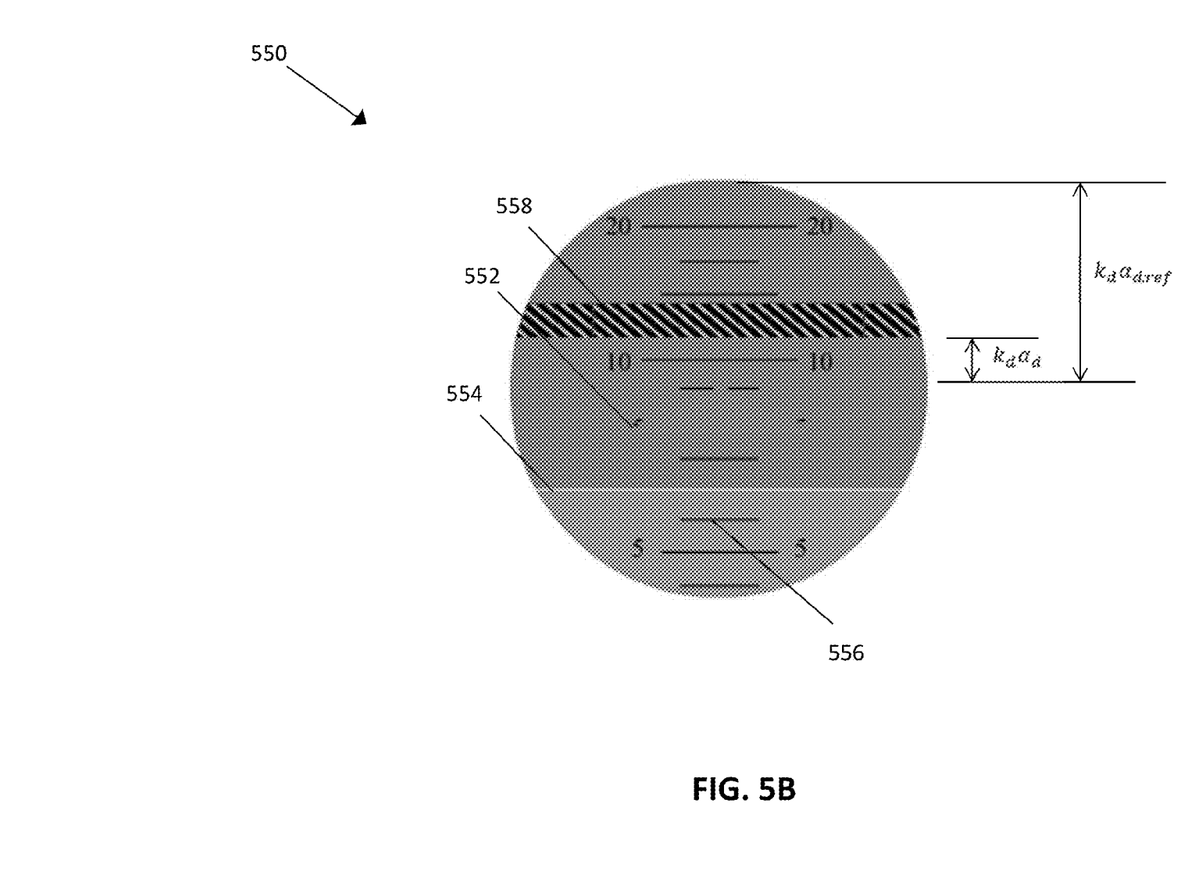
FIG. 5B depicts a visual tailstrike proximity warning system, in accordance with an embodiment.

FIG. 5B depicts a visual tailstrike proximity warning system, in accordance with an embodiment. Flight director 550 includes a fixed aircraft symbol 552, horizon line 554, pitch indices 556, and a tailstrike ceiling 558. Tailstrike ceiling 558 differs from tailstrike ceiling 510 in that it allows a pilot to see the area of the flight director above the tailstrike ceiling.

One skilled in the relevant art will recognize that many possible modifications and combinations of the disclosed embodiments can be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations can be possible in view of the above teachings. The embodiments were chosen and described to explain the principles of the disclosure and their practical applications, and to enable others skilled in the art to best utilize the disclosure and various embodiments with various modifications as suited to the particular use contemplated.

Further, while this specification contains many specifics, these should not be construed as limitations on the scope of what is being claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aircraft tailstrike warning method comprising:
   identifying an aircraft angle of attack,
   identifying a maximum aircraft angle of attack,
   determining a dynamic limit of aircraft proximity to tailstrike based on the aircraft angle of attack and the maximum aircraft angle of attack, and
   displaying the dynamic limit as a distance from a reference point multiplied by a scale factor, the scale factor selected such that the dynamic limit is not displayed when the aircraft is at a predetermined angle of attack for takeoff or approach at a first reference airspeed.

2. The method of claim 1, wherein the scale factor is selected such that the dynamic limit is not displayed when the aircraft is at the predetermined angle of attack for takeoff.

\* \* \* \* \*